(12) United States Patent
Oskotsky et al.

(10) Patent No.: US 10,620,408 B2
(45) Date of Patent: Apr. 14, 2020

(54) COMPACT ORTHOSCOPIC VNIR/SWIR LENS

(71) Applicant: BAE Systems Information and Electronic Systems Integration Inc., Nashua, NH (US)

(72) Inventors: Mark L Oskotsky, Mamaroneck, NY (US); Michael J Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 125 days.

(21) Appl. No.: 15/646,844

(22) Filed: Jul. 11, 2017

(65) Prior Publication Data

US 2019/0018228 A1    Jan. 17, 2019

(51) Int. Cl.
*G02B 13/14* (2006.01)
*G02B 9/64* (2006.01)

(52) U.S. Cl.
CPC ............. *G02B 13/14* (2013.01); *G02B 9/64* (2013.01)

(58) Field of Classification Search
None
See application file for complete search history.

(56) References Cited

U.S. PATENT DOCUMENTS

| | | | |
|---|---|---|---|
| 5,420,681 A | 5/1995 | Woodruff | |
| 5,621,575 A | 4/1997 | Toyama | |
| 5,781,290 A | 7/1998 | Bittner | |
| 5,781,336 A * | 7/1998 | Coon | G02B 13/146 359/350 |
| 6,122,051 A | 9/2000 | Ansley | |
| 6,208,459 B1 | 3/2001 | Coon | |
| 6,556,297 B1 | 4/2003 | Cappiello | |
| 6,980,295 B2 | 12/2005 | Lerner | |

(Continued)

OTHER PUBLICATIONS

R. Hamilton Shepard, The Design of SWIR Imaging Lenses Using Plastic Optics, Downloaded From: http://spiedigitallibrary.org/ on Apr. 17, 2014 Terms of Use: http://spiedl.org/terms, 11 pages.

(Continued)

*Primary Examiner* — Derek S. Chapel
(74) *Attorney, Agent, or Firm* — Maine Cernota & Rardin; Scott J. Asmus

(57) ABSTRACT

A compact orthoscopic lens is corrected for monochromatic and chromatic aberrations over wavelengths from 450 to 2450 nm with an angular FOV of 5.56° vertical and 66° horizontal. The 4.36" effective focal length lens with f-number of 4 is compact measuring 5.2" from the first optical surface to the image. The lens includes, in order from object to image, a first optical group having a negative optical power; a second optical group having a positive optical power and a third optical group having a negative optical power. The first optical group consists of two elements, the second optical group consists of three elements, one a doublet, and the third optical group consists of two elements. A physical aperture stop is positioned inside the second optical group. Powers of groups and elements, shapes, refractive indices, Abbe numbers and partial dispersions of glasses are selected so the lens is apochromatic and orthoscopic.

17 Claims, 9 Drawing Sheets

FIRST EMBODIMENT OF WIDE SPECTRUM LENS

(56) References Cited

U.S. PATENT DOCUMENTS

| | | |
|---|---|---|
| 7,006,217 B2 | 2/2006 | Lerner |
| 7,199,876 B2 | 4/2007 | Mitchell |
| 7,271,965 B1 | 9/2007 | Oskotsky |
| 7,609,381 B2 | 10/2009 | Warren |
| 7,768,642 B2 | 8/2010 | Oskotsky |
| 8,203,710 B1 | 6/2012 | Mitchell |
| 8,289,633 B2 | 10/2012 | Caldwell |
| 8,339,600 B2 | 12/2012 | Chrisp |
| 8,520,204 B2 | 8/2013 | Desserouer |
| 8,817,392 B2 | 8/2014 | Oskotsky |
| 9,689,744 B2 | 6/2017 | Chrisp |
| 2003/0234751 A1 | 12/2003 | Hwang |
| 2004/0145819 A1 | 7/2004 | Wang et al. |
| 2004/0156048 A1 | 8/2004 | Mitchell |
| 2004/0239939 A1 | 12/2004 | Guerineau |
| 2005/0052647 A1 | 3/2005 | Lerner |
| 2005/0179895 A1 | 8/2005 | Puppels |
| 2005/0259253 A1 | 11/2005 | Lerner |
| 2006/0038994 A1 | 2/2006 | Chrisp |
| 2006/0082772 A1 | 4/2006 | Kehoe |
| 2007/0098324 A1 | 5/2007 | Kitamura |
| 2007/0164221 A1 | 7/2007 | Russell |
| 2007/0171415 A1 | 7/2007 | Chrisp |
| 2008/0273244 A1 | 11/2008 | Oskotsky |
| 2009/0237657 A1 | 9/2009 | Warren |
| 2009/0296201 A1 | 12/2009 | Caldwell |
| 2010/0051802 A1 | 3/2010 | Marchmanl |
| 2010/0245650 A1 | 9/2010 | Kreysar |
| 2010/0328659 A1 | 12/2010 | Bodkin |
| 2011/0188038 A1 | 8/2011 | Gollier |
| 2011/0222061 A1 | 9/2011 | Desserouer |
| 2011/0285995 A1 | 11/2011 | Tkaczyk |
| 2012/0002202 A1 | 1/2012 | Chrisp |
| 2012/0062889 A1 | 3/2012 | Chrisp |
| 2012/0147483 A1 | 6/2012 | Oskotsky |
| 2013/0050839 A1* | 2/2013 | Oskotsky ................. G02B 9/12 359/662 |
| 2013/0148195 A1 | 6/2013 | Achal |
| 2013/0229654 A1 | 9/2013 | Tatsuta |
| 2014/0071449 A1 | 3/2014 | Robinson |
| 2014/0160474 A1 | 6/2014 | Keller |
| 2014/0268315 A1* | 9/2014 | Carlie ................... G02B 13/14 359/356 |
| 2014/0376106 A1* | 12/2014 | Oskotsky ............... G02B 7/028 359/708 |
| 2015/0241667 A1 | 8/2015 | Staver |
| 2015/0369917 A1 | 12/2015 | Bridges |
| 2016/0041033 A1 | 2/2016 | Oskotsky |
| 2018/0067280 A1 | 3/2018 | Unger |
| 2018/0080826 A1 | 3/2018 | Silny |
| 2018/0136039 A1 | 5/2018 | Rolland |

OTHER PUBLICATIONS

R. Hamilton Shepard, Material Selection for Color Correction in the Short-Wave Infrared, Downloaded From: http://spiedigitallibrary.org/ on Apr. 17, 2014 Terms of Use: http://spiedl.org/terms, 10 pages.

M. Maszkiewicz, Optics for The Canadian Hyperspectral Mission (HERO), Proc. '6th Internat. Conf. on Space Optics', ESTEC, Noordwijk, The Netherlands, Jun. 27-30, 2006 (ESA SP-621, Jun. 2006), 4 pages.

* cited by examiner

100

PRIOR ART

ABBE NUMBERS AND RELATIVE PARTIAL DISPERSIONS FOR SCHOTT
GLASSES

FIRST EMBODIMENT OF WIDE SPECTRUM LENS

SPATIAL FREQUENCY (CYCLES/MM)
DIFFRACTION MODULATION TRANSFER FUNCTION (MTF) FOR LENS OF FIG. 2

ASTIGMATISM AND DISTORTION CORRECTION ACROSS THE FIELD FOR THE LENS OF FIG. 2

LATERAL COLOR CORRECTION FOR THE LENS OF FIG. 2

600

VNIR / SWIR LENS

|  | RADIUS | THICKNESS | GLASS |
|---|---|---|---|
| > OBJ: | INFINITY | INFINITY | |
| 1: | INFINITY | 0.337461 | SILICA_SPECIAL |
| SLB: "window" | | | |
| 2: | INFINITY | 2.499913 | |
| 3: | INFINITY | 1.518576 | |
| SLB: "fold 1" | | | |
| 4: | INFINITY | 1.116322 | 1 |
| SLB: "fold2" | | | |
| 5: | -6.87449 | 0.150000 | NKZFS4_SCHOTT |
| 6: | 3.55781 | 0.050000 | |

ASPHERIC COEFFICIENTS:
K: 0.000000
A: 0.402920E-01  B: 0.829285E-02  C: 0.748490E-02  D: -0.204869E-02
E: 0.153946E-02

| 7: | 1.69158 | 0.290000 | NPK51_SCHOTT |
|---|---|---|---|
| 8: | 4.87566 | 0.403444 | |
| 9: | 2.83550 | 0.270000 | NLAK22_SCHOTT |
| 10: | -4.63409 | 0.036190 | |
| APERTURE STOP | | | |
| | INFINITY | 0.100000 | |
| 12: | 5.73398 | 0.317030 | NLAK22_SCHOTT |
| 13: | -1.56310 | 0.200000 | KZFSN5_SCHOTT |
| 14: | 3.83359 | 0.294575 | |
| 15: | -2.76232 | 0.200000 | NKZFS11_SCHOTT |

ASPHERIC COEFFICIENTS:
K: 0.000000
A: -.356607E-01  B:-.111211E-01  C: -.876786E-02  D: -.120610E-01
E: 0.136409E-01

| 16: | -2.13046 | 1.211623 | |
|---|---|---|---|
| 17: | -1.29299 | 0.250000 | NFK5_SCHOTT |
| 18: | -2.10511 | 0.110300 | |
| 19: | -1.78878 | 0.300000 | NLAF2_SCHOTT |

ASPHERIC COEFFICIENTS:
K: 0.000000
A: 0.211441E-01  B: 0.127829E-02  C: 0.283505E-02  D: -.123814E-02
E :0.337120E-03

| 20: | -3.24283 | 0.551176 | |
|---|---|---|---|
| 21: | INFINITY | 0.107988 | 'OG-570' |
| 22: | INFINITY | 0.070192 | |
| 23: | INFINITY | 0.053994 | SAPHIR_SPECIAL |
| 24: | INFINITY | 0.216650 | |
| IMG: | INFINITY | -0.000000 | |

SPECIFICATION DATA: F#: 4.00000
DIMENSIONS         INCHES
WAVE LENGTH, NM:
2500.00 2350.00 2000.00 1800.00 1500.00 1250.00 1000.00 900.00 700.00 500.00

PRESCRIPTION PAGE 1 OF 4
FIG. 6

700

| | | | | | | | | | | |
|---|---|---|---|---|---|---|---|---|---|---|
| REF | 5 | | | | | | | | | |
| WAVELENGTHS: | 2500.00 | 2350.00 | 2000.00 | 1800.00 | 1500.00 | 1250.00 | 1000.00 | 900.00 | 700.00 | 500.00 |
| & WEIGHTS: | 1 | 2 | 2 | 3 | 3 | 3 | 3 | 2 | 2 | 1 |

| | | | | | |
|---|---|---|---|---|---|
| X (ANG.) | 0.00000 | 2.78000 | -2.78000 | 2.78000 | -2.78000 |
| | 2.78000 | -2.78000 | 2.78000 | -2.78000 | 2.78000 |
| | -2.78000 | 2.78000 | -2.78000 | 2.78000 | -2.78000 |
| | 2.78000 | -2.78000 | 2.78000 | -2.78000 | 2.78000 |
| | -2.78000 | | | | |
| | | | | | |
| Y (ANG.) | 0.00000 | 10.00000 | 10.00000 | -10.00000 | -10.00000 |
| | 16.00000 | 16.00000 | -16.00000 | -16.00000 | 21.00000 |
| | 21.00000 | -21.00000 | -21.00000 | 27.00000 | 27.00000 |
| | -27.00000 | -27.00000 | 33.00000 | 33.00000 | -33.00000 |
| | -33.00000 | | | | |
| | | | | | |
| WTF | 1.00000 | 1.00000 | 1.00000 | 1.00000 | 1.00000 |
| | 1.00000 | 1.00000 | 1.00000 | 1.00000 | 1.00000 |
| | 1.00000 | 1.00000 | 1.00000 | 1.00000 | 1.00000 |
| | 1.00000 | 1.00000 | 1.00000 | 1.00000 | 1.00000 |
| | 1.00000 | | | | |
| | | | | | |
| VUX | 0.00000 | -0.00196 | 0.01073 | -0.00196 | 0.01073 |
| | 0.00399 | 0.01639 | 0.00399 | 0.01639 | 0.01112 |
| | 0.02316 | 0.01112 | 0.02316 | 0.02231 | 0.03377 |
| | 0.02231 | 0.03377 | 0.03627 | 0.04700 | 0.03627 |
| | 0.04700 | | | | |
| | | | | | |
| VLX | 0.00000 | 0.01073 | -0.00196 | 0.01073 | -0.00196 |
| | 0.01639 | 0.00399 | 0.01639 | 0.00399 | 0.02316 |
| | 0.01112 | 0.02316 | 0.01112 | 0.03377 | 0.02231 |
| | 0.03377 | 0.02231 | 0.04700 | 0.03627 | 0.04700 |
| | 0.03627 | | | | |
| | | | | | |
| VUY | 0.00000 | -0.01316 | -0.01316 | 0.03233 | 0.03233 |
| | -0.01037 | -0.01037 | 0.05993 | 0.05993 | 0.00000 |
| | 0.00000 | 0.08768 | 0.08768 | 0.02465 | 0.02465 |
| | 0.12650 | 0.12650 | 0.06562 | 0.06562 | 0.17077 |
| | 0.17077 | | | | |
| | | | | | |
| VLY | 0.00000 | 0.03233 | 0.03233 | -0.01316 | -0.01316 |
| | 0.05993 | 0.05993 | -0.01037 | -0.01037 | 0.08768 |
| | 0.08768 | 0.00000 | 0.00000 | 0.12650 | 0.12650 |
| | 0.02465 | 0.02465 | 0.17077 | 0.17077 | 0.06562 |
| | 0.06562 | | | | |
| | | | | | |
| POL | N | | | | |

PRESCRIPTION PAGE 2 OF 4

APERTURE DATA/EDGE DEFINITIONS
CA APE
CIR S0      *********** ! [A1]
CIR S1      4.544281 ! [A1]
CIR S2      4.406609 ! [A1]
CIR S3      2.778724 ! [A1]
CIR S4      1.789960 ! [A1]
CIR S5      1.123448 ! [A1]
CIR S6      0.999381 ! [A1]
CIR S7      0.978321 ! [A1]
CIR S8      0.955566 ! [A1]
CIR S9      0.797677 ! [A1]
CIR S10     0.766378 ! [A1]
CIR S11     0.553394 ! [A1]
CIR S12     0.638633 ! [A1]
CIR S13     0.660200 ! [A1]
CIR S14     0.726343 ! [A1]
CIR S15     0.768496 ! [A1]
CIR S16     0.832090 ! [A1]
CIR S17     1.122561 ! [A1]
CIR S18     1.389449 ! [A1]
CIR S19     1.423904 ! [A1]
CIR S20     1.707883 ! [A1]
CIR S21     2.540217 ! [A1]
CIR S22     2.588610 ! [A1]
CIR S23     2.644931 ! [A1]
CIR S24     2.665647 ! [A1]
CIR S25     2.839576 ! [A1]

PRIVATE CATALOG
REFRACTIVE INDICES

| PWAVELENGTH: | 950.00 | 800.00 | 700.00 | 600.00 | 570.00 |
|---|---|---|---|---|---|
| GLASS CODE | | | | | |
| 'OG-570' | 1.531000 | 1.532000 | 1.535000 | 1.538000 | 1.540000 |

WAVELENGTH:

| | 2500.00 | 2350.00 | 2000.00 | 1800.00 | 1500.00 | 1250.00 | 1000.00 | 900.00 | 700.00 | 500.00 |
|---|---|---|---|---|---|---|---|---|---|---|
| GLASS CODE | | | | | | | | | | |
| SAPHIR_SPECIAL | 1.726257 | 1.729951 | 1.737726 | 1.741687 | 1.747097 | 1.751321 | 1.755739 | 1.757783 | 1.763270 | 1.774319 |
| 'OG-570' | 1.530155 | 1.530167 | 1.530209 | 1.530245 | 1.530335 | 1.530482 | 1.530852 | 1.531206 | 1.535000 | 1.555581 |
| SILICA_SPECIAL | 1.429803 | 1.432502 | 1.438080 | 1.440867 | 1.444612 | 1.447479 | 1.450416 | 1.451753 | 1.455294 | 1.462331 |
| NLAF2_SCHOTT | 1.702608 | 1.705380 | 1.711226 | 1.714256 | 1.718583 | 1.722310 | 1.726862 | 1.729271 | 1.736597 | 1.753567 |
| KZFSN5_SCHOTT | 1.606756 | 1.610492 | 1.618200 | 1.622082 | 1.627437 | 1.631807 | 1.636809 | 1.639337 | 1.646771 | 1.663660 |
| NLAK22_SCHOTT | 1.615993 | 1.618725 | 1.624434 | 1.627344 | 1.631388 | 1.634698 | 1.638469 | 1.640358 | 1.645835 | 1.657837 |
| NPK51_SCHOTT | 1.508090 | 1.509626 | 1.512866 | 1.514534 | 1.516873 | 1.518809 | 1.521036 | 1.522157 | 1.525415 | 1.532502 |
| NFK5_SCHOTT | 1.458694 | 1.461386 | 1.466949 | 1.469731 | 1.473471 | 1.476342 | 1.479297 | 1.480649 | 1.484249 | 1.491449 |
| NKZFS4_SCHOTT | 1.571472 | 1.574820 | 1.581781 | 1.585308 | 1.590175 | 1.594120 | 1.598561 | 1.600769 | 1.607156 | 1.621312 |
| NKZFS11_SCHOTT | 1.592884 | 1.596434 | 1.603815 | 1.607556 | 1.612727 | 1.616933 | 1.621695 | 1.624076 | 1.630997 | 1.646428 |

FIG. 8

900
No solves defined in system; no pickups defined in system. This is a non-symmetric system. If elements with power are decentered or tilted, the first order properties as determined from the paraxial ray trace may be inaccurate.

INFINITE CONJUGATES

EFL: 4.3606    BFL: 0.2197    FFL:    -0.5546    F#: 4.0000
IMAGE DIST.: 0.2167    OVERALL LENGTH: 10.4388
PARAXIAL IMAGE:    HEIGHT: 2.8318    ANGLE:    33.0000
ENTRANCE PUPIL:    DIA.: 1.0901    THICKNESS: 6.2822
EXIT PUPIL:    DIA.: 0.6953    THICKNESS: -2.5615

DEFINITIONS AND ABBREVIATIONS:

The form of asphere surfaces is as follows:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

where:

- $z$     is the sag of the surface parallel to the z-axis
- $c$     is the curvature at the pole of the surface (CUY)
- $k$     is the conic constant (K) and

- $k = 0$     —     sphere
  - $-1 < k < 0$     —     ellipsoid with major axis on the optical axis (prolate spheroid)
  - $k = -1$     —     paraboloid
  - $k < -1$     —     hyperboloid Also, $k = -e^2$, where e is eccentricity For $k > 0$     —     oblate spheroid (not a conic section) the surface is generated by rotating an ellipse about its minor axis and $$k = e^2/(1 - e^2)$$

where e is the eccentricity of the generating ellipse

- A, B, C, D, E, F, G, H, J     are the 4th, 6th, 8th, 10th, 12th, 14th, 16th, 18th, 20th order deformation coefficients, respectively (A = B = C = D = E = F = G = H = J = 0 yields a pure conic surface)
- $r$     is the radial distance = $\sqrt{x^2+y^2}$

COMPACT ORTHOSCOPIC VNIR/SWIR LENS

FIELD OF THE DISCLOSURE

Embodiments relate to wide wavelength range lenses, more particularly to orthoscopic lenses which are corrected for both visible and near-infrared (VNIR) and shortwave infrared (SWIR) bands collectively spanning 450 nm to 2450 nm. These lenses are suitable for, but not limited to, airborne sensor systems where excellent optical performance over a wide range of wavelengths is essential for high resolution imaging.

BACKGROUND

Individual VNIR and SWIR lenses are often used together in airborne imaging sensors designed for high resolution wide wavelength range imaging applications such as reconnaissance and surveillance or mapping. For these applications, each lens must meet strict optical requirements over their individual bands: the VNIR lens covering a wavelength range from 450 nm to 900 nm and the SWIR lens covering a wavelength range from 900 nm to 2450 nm. Each lens typically utilizes a number of glass elements to provide the necessary optical performance over its individual band. Such wide wavelength range lenses must also provide high transmission, high resolution, low distortion, and a flat image over large field of view to be useful.

U.S. Pat. No. 6,208,459 (Mar. 27, 2001) discloses a wide band lens made out of MgO and CaF2 materials. However, this lens has drawbacks. It has a relatively small field of view (FOV), and is not very compact. In addition, both materials are expensive. CaF2 is also a very soft material, making fabrication of lens elements difficult, especially aspheric elements.

The design of SWIR lenses has been described in "The Design of SWIR Imaging Lenses Using Plastic Optics" by R. Hamilton Shepard, Proc. of SPIE Vol. 8489 84890A-1. These lenses utilize the mix of elements made out of plastic materials and glass and are corrected for the spectrum 900 nm-1700 nm. Absorption in the plastics, especially for the wavelength above 1μm, is very high and significantly reduces the lens transmission. Also, large field of view lenses cannot be developed because of plastics' low indices of refraction.

U.S. Pat. No. 8,289,633 (Oct. 16, 2012) discloses a lens corrected over a wide wavelength range of 315 nm-1100 nm. However, it cannot be used for the SWIR wavelength range above 1100 nm.

U.S. Pat. No. 8,817,392 (Aug. 26, 2014) discloses a wide field apochromatic lens. However, it is also corrected only for the VNIR spectrum from 550 nm-950 nm. Another example of a lens corrected for the VNIR spectrum is disclosed in U.S. Pat. No. 7,271,965 (Sep. 18, 2007). However, it too suffers from a limited wavelength range.

A wide wavelength range lens has to be apochromatic in order to obtain residual color (or secondary color) correction. That means that the lens optical groups and elements in these groups shall be configured and positioned relative to one another so that the focal length of the lens is the same at wavelengths not only at the ends of the spectrum of interest, but at intermediate wavelengths as well. Without such aberrational correction, the focal length of the system would vary undesirably with the wavelength of light received from the object, causing chromatic aberration or color fringes to appear at the edges of the projected image of the object.

Apochromatic correction has to be done for at least one intermediate wavelength to have good lens performance over a wide wavelength range. Correction at more than one intermediate wavelength enables good optical performance throughout the whole spectrum. Apochromatic correction requires glasses with special dispersive properties through the whole spectrum of interest. At the same time optical powers of lens groups and elements must be maintained to provide the necessary basic optical performance parameters.

Glasses of normal dispersion, which have an almost linear decrease in refractive index with increasing wavelength, are used to produce achromatic objectives. In this case, remaining secondary spectrum (also called lateral color) produces greenish or purple fringes on images of sharp edges. The higher quality apochromatic objectives use glasses having an abnormal partial dispersion; these glasses refractive index changes with wavelength more rapidly in either the blue or red region. As a result, apochromats have a high degree of chromatic correction in which three or more wavelengths can have the same image location.

The contribution of the optical element to the total axial color is proportional to the square of axial marginal ray height at the lens, its optical power, and it is reciprocal of Abbe number of lens.

The Abbe number V in terms of refractive indices for the VNIR/SWIR 450 nm-2450 nm spectrum is determined by:

$$V=(n_{1450}-1)/(n_{450}-n_{2450})$$

Where n is the refractive index of glass for the specific wavelength of interest.

The dispersive characteristics of various glasses may be compared by plotting the relative partial dispersion $P_{x,y}$ versus the Abbe-number V. These quantities share a linear correspondence for most optical glasses and therefore plot along a single straight line. Glasses exhibiting this behavior are referred to as "normal dispersion glasses". The partial dispersion P for the wave lengths range x-y of these glasses can be approximately described by the following equation:

$$P_{x,y} \approx a_{x,y}+b_{x,y} \cdot V$$

where $a_{x,y}$ and $b_{x,y}$ are constants. Glasses which deviate significantly from the line described by this equation are called "abnormal dispersion glasses". For any glass, the deviation of the partial dispersion from the "normal line" can be represented by the quantity $\Delta P_{x,y}$. A more general expression for $P_{x,y}$ is then given by the following equation:

$$P_{x,y}=a_{x,y}+b_{x,y} \cdot V+\Delta P_{x,y}$$

The partial dispersion for the wide VNIR/SWIR spectrum is determined by the following equation:

$$P=(n_{1450}-n_{2450})/(n_{450}-n_{2450})$$

FIG. 1 depicts known Abbe numbers and relative partial dispersions 100 for Schott glasses.

The orthoscopic property (low distortion) of a lens is also important, as it provides a precisely scaled image of the target because the variation of focal length across the field is minimized. This feature is very important for airborne sensors intended for the identification and accurate mapping of objects.

Existing wide wavelength range lenses are not orthoscopic and their residual distortion is not less than 1%, so the precise measurements of the target characteristics and location cannot be performed without significant post processing of the image.

Therefore, there exists a need in the art for a high performance VNIR/SWIR airborne sensor lens with a wide wavelength range that is simultaneously low distortion or orthoscopic. Further, the application of a single high performance lens covering both VNIR and SWIR bands allows a sensor system with reduced size, weight, power, and complexity (SWAP-C).

SUMMARY

An embodiment provides a compact orthoscopic and apochromatic visible and near-infrared (VNIR) and shortwave infrared (SWIR) lens system, in order from an object plane to an image plane, comprising a first optical group having a negative optical power; a second optical group having a positive optical power; a third optical group having a negative optical power; an aperture positioned inside the second optical group; wherein the lens system is compact, as measured from a first optical surface to the image plane; wherein the lens system is orthoscopic regarding residual distortion over a full field of view; and wherein the lens system is apochromatic over a spectral range of 450 nm to 2550 nm. In embodiments the first optical group includes exactly two optical lens elements, the two optical elements have, in order from the object, negative and positive optical powers. In other embodiments, the second optical group includes exactly four optical lens elements, the four optical elements have, in order from the object, positive, positive, negative, and positive optical powers. In subsequent embodiments the third optical group includes exactly two optical lens elements, the two optical elements both have negative optical powers. For additional embodiments the second optical group second and third elements are cemented into a doublet. In another embodiment, the first optical element of the first optical group comprises a double concave optical element. For a following embodiment the second optical element of the first optical group is a positive optical power meniscus whose concave surface faces toward the image plane. In subsequent embodiments the first optical element of the second optical group has a positive optical power and is made in a form of a double convex element. In additional embodiments the second optical element of the second optical group has a positive optical power and is made in a form of a double convex element. In included embodiments the third optical element of the second optical group has a negative optical power and is made in a form of a double concave element. In yet further embodiments the fourth optical element of the second optical group has a positive optical power and is made in a form of a meniscus whose concave surfaces face toward the object plane. In related embodiments the first optical element of the third optical group is a negative optical power meniscus whose concave surface faces toward the object plane. For further embodiments the second optical element of the third optical group is a negative optical power meniscus whose concave surface faces toward the object plane. Ensuing embodiments further comprise a color filter and a focal plane window in front of the focal plane.

Another embodiment provides A method for forming a near-infrared (VNIR) and shortwave infrared (SWIR) image comprising providing a compact orthoscopic and apochromatic visible and near-infrared (VNIR) and shortwave infrared (SWIR) lens system, in order from an object plane to an image plane, comprising a first optical group having a negative optical power, including exactly two optical lens elements; a second optical group having a positive optical power and including exactly four optical lens elements, an aperture stop positioned inside the second optical group; a third optical group having a negative optical power and including exactly two optical lens elements; and a focal plane; wherein the lens system is compact, as measured from a first optical surface to the image plane; wherein the lens system is orthoscopic regarding residual distortion over a full field of view; and wherein the lens system is apochromatic over a spectral range of 450 nm to 2550 nm; and orienting the lens system toward an object, whereby an image of the object is formed on the focal plane. For yet further embodiments, the first optical group is arranged to diverge light received from an object and to direct the diverged light onto the second optical group. For more embodiments, the second optical group is arranged to converge light from the first optical group and to direct the converged light onto the third optical group. Continued embodiments include that the third optical group is arranged to diverge light from the second optical group and to direct it onto the focal plane. For additional embodiments, the Aperture Stop (AS) is positioned inside the second optical group between the first and the second elements of the second group.

A yet further embodiment provides an airborne sensor comprising a compact orthoscopic and apochromatic visible and near-infrared (VNIR) and shortwave infrared (SWIR) lens system, in order from an object plane to an image plane, comprising a first optical group having a negative optical power, including exactly two optical lens elements; a second optical group having a positive optical power and including exactly four optical lens elements; a third optical group having a negative optical power and including exactly two optical lens elements; an aperture positioned inside the second optical group; and a focal plane; wherein the sensor is compact, with an overall length of 5.2 inches as measured from a first optical surface to the image plane; wherein the sensor is orthoscopic with a residual distortion not exceeding 0.11% over a full field of view of 5.56° to 66°; and wherein the sensor is apochromatic over a spectral range of 450 nm to 2550 nm; whereby an image of an object is formed on the focal plane; wherein the focal plane comprises a Charge-Coupled Device (CCD) or Complementary Metal-Oxide-Semiconductor (CMOS' sensor; and whereby the sensor provides reduced size, weight, power, and complexity (SWAP-C).

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIGS. 6-9 depict a prescription of the lens in FIG. 2 configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

The present embodiment describes a VNIR/SWIR spectrum orthoscopic and apochromatic lens. The lens is corrected for monochromatic and chromatic aberrations for the wide spectrum of 450 nm-2550 nm covering both VNIR and SWIR spectral regions. The lens is orthoscopic with residual distortion across the field of 5.56°×66° not exceeding 0.11%.

According to present embodiment, a wide spectrum lens includes first optical group having a negative optical power, a second optical group having a positive optical power, and a third optical group having a negative optical power. The first, the second, and the third optical groups are positioned in the stated order from the object to the image plane.

The first optical group consists of two optical elements having, in order from the object, negative and positive optical powers. The first optical group is arranged to diverge light received from the object and to direct the diverged light onto the second optical group. The second optical group consists of four optical elements having, in order from the object, positive, positive, negative, and positive optical powers. The second and third elements of the second optical groups are cemented into a doublet. The second optical group is arranged to converge the light from the first optical group and to direct the converged light onto the third optical group. The third optical group includes two optical elements both having negative optical powers. The third optical group is arranged to diverge the light from the second optical group and to direct it onto the focal plane. The optical powers and shape of the components, refractive indices, Abbe numbers, and partial dispersions of the glasses are selected such that the lens is apochromatic for the range of 450 nm to 2450 nm and provides an orthoscopic and flat image. The 4.36" effective focal length lens with an f-number of 4 is compact with an overall length of 5.2 inches as measured from the first optical surface to the image.

Figure 1:
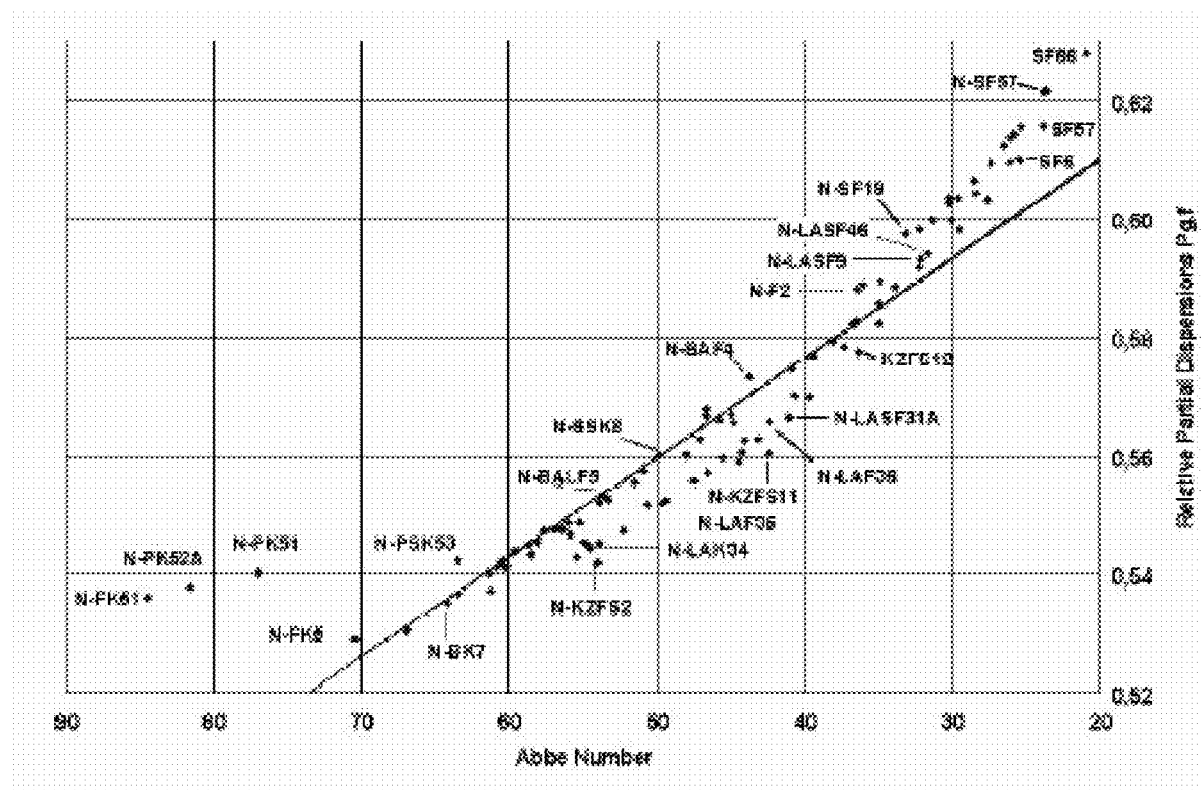
FIG. 1 depicts Abbe numbers and relative partial dispersions for Schott glasses.
Figure 2:
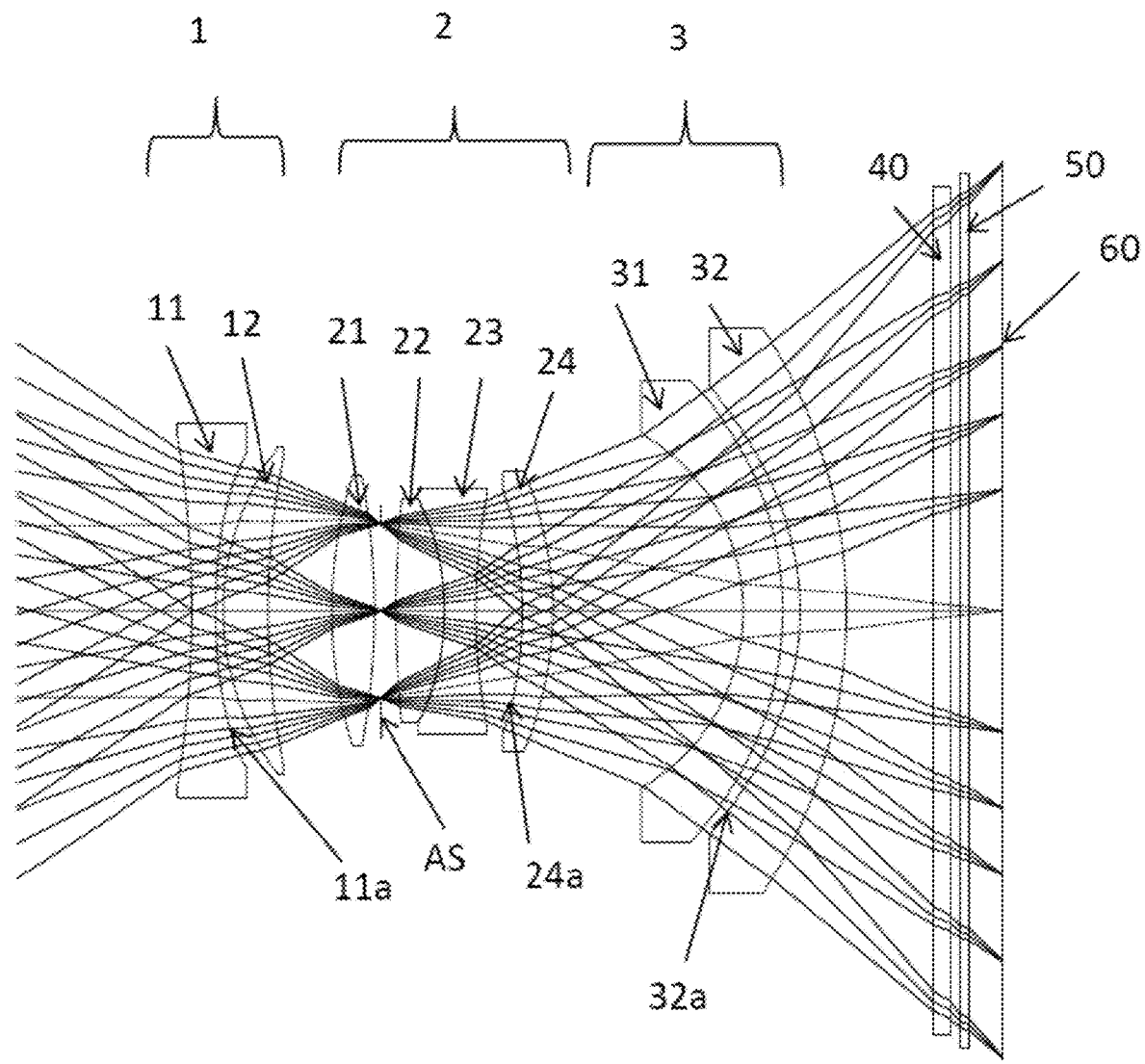
FIG. 2 shows a first embodiment of a wide spectrum lens.

FIG. 2 shows a first embodiment of a wide spectrum lens. The lens 200 includes the first optical group 1, the second optical group 2, the third optical group 3, color filter 40 and focal plane window 50. Aperture stop AS is positioned inside the second optical group. Image of the remote object is formed on a focal plane 60 which may comprise CCD or CMOS.

Specification for this Lens are as Follows:

| | |
|---|---|
| EFL | 4.36 inches |
| WL | 2450 nm-450 nm |
| F# | 4 |
| FOV | 5.56° × 66° |
| OAL | 5.2 inches |
| Distortion | <0.2% cross field |
| Lateral color | corrected |

A first optical group 1 has a negative overall optical power and is configured to receive light from the remote object and to direct the diverged light onto the second optical group 2. The group 1 includes first optical element 11 having a negative optical power and made in a form of a double concave optical element and second optical element 12 made in a form of a positive optical power meniscus whose concave surface faces toward the image. The second surface 11a of the first element 11 is formed as aspherical in order to correct for the spherical aberration and coma across the field. Element 11 is made out of Schott glass N-KZFS4 and element 12 is made out of Schott glass N-PK51.

The second optical group 2 has a positive overall optical power and is configured to converge the light from the first optical group 1 and to direct converged light onto the third optical group 3. The second optical 2 group consists of four optical elements 21, 22, 23 and 24. The first optical element 21 has a positive optical power and is made in a form of a double convex element. Element 21 is made out of Schott glass N-LAK22. The second optical element 22 has a positive optical power and is made in a form of a double convex element. Element 22 is made out of Schott glass N-LAK22. The third optical element 23 has a negative optical power and is made in a form of a double concave element. Element 23 is made out of Schott glass KZFSN5. The second optical element 22 and the third optical element 23 are cemented into a doublet. The fourth optical element 24 has a positive optical power and is made in a form of a meniscus whose concave surfaces face toward the object. Element 24 is made out of Schott glass N-KZFS11. The aperture stop (AS) is positioned between elements 21 and 22. The mutual configuration of the elements and choice of their glasses allow correction of chromatic and lateral color chromatic aberrations as well as low order coma and residual spherical aberration correction.

The third optical group 3 has a negative optical power and is configured to diverge light from the second optical group 2 and to direct diverged light onto the focal plane 60. The third optical group 3 consists of two elements 31 and 32 which are made in a form of a negative optical power meniscus whose concave surface faces toward the object. The first surface 32a of the second element 32 is formed as aspherical in order to correct for the residual high order astigmatism and distortion across the field. Combination of the optical groups' optical powers along with the elements' shapes and optical powers allows correction of the low order astigmatism and field curvature while developing the wide field of view.

The following relations among the optical groups 1, 2 and 3 and their constituent optical elements achieve monochromatic and apochromatic aberrational correction across the field.

$$-0.25 < F'_{200}/F'_1 < -0.15$$

$$-8.5 < F'_1/F'_2 < -7.0$$

$$5.5 < F'_1/F'_3 < 7.5$$

$$0.75 < F'_{200}/OAL < 0.90$$

$$0.95 < n_{11}/n_{12} < 1.20$$

$$0.85 < n_{21}/n_{22} < 1.10$$

$$0.95 < n_{22}/n_{23} < 1.15$$

$$0.90 < n_{21}/n_{24} < 1.10$$

$$0.95 < n_{24}/n_{31} < 1.25$$

$$0.75 < n_{31}/n_{32} < 0.95$$

$$0.45 < V_{11}/V_{12} < 0.65$$

$$1.35 < V_{12}/V_{21} < 1.65$$

$$0.70 < V_{21}/V_{22} < 0.90$$

$$1.20 < V_{22}/V_{23} < 1.40$$

$$0.95 < V_{23}/V_{24} < 1.15$$

$$0.60 < V_{24}/V_{31} < 0.85$$

$$1.05 < V_{31}/V_{32} < 1.20$$

$$1.10 < P_{11}/P_{12} < 1.25$$

$$0.80 < P_{12}/P_{21} < 0.90$$

$$0.90 < P_{21}/P_{22} < 1.15$$

$$0.95 < P_{22}/P_{23} < 1.10$$

$$1.25 < P_{23}/P_{24} < 1.55$$

$$0.40 < P_{24}/P_{31} < 0.60$$

$$1.10 < P_{31}/P_{32} < 1.35$$

Wherein:

$F'_{200}$ is the focal length of the lens 200;

$F'_1$, $F'_2$ and $F'_3$ are the focal lengths of the first, the second and the third optical groups 1, 2 and 3 correspondingly;

OAL is the length of the lens 200 from the first surface to the image plane;

$n_{11}$ is the refractive index for first element 11 of first optical group 10;

$n_{12}$ is the refractive index for second element 12 of first optical group 10;

$n_{21}$ is the refractive index for first element 21 of second optical group 20;

$n_{22}$ is refractive index for second element 22 of second optical group 20;

$n_{23}$ is the refractive index for third element 23 of second optical group 20;

$n_{24}$ is the refractive index for fourth element 24 of second optical group 20;

$n_{31}$ is the refractive index for first element 31 of third optical group 30;

$n_{32}$ is the refractive index for second element 32 of third optical group 30;

$V_{11}$ is the Abbe number for first element 11 of first optical group 10;

$V_{12}$ is the Abbe number for second element 12 of first optical group 10;

$V_{21}$ is the Abbe number for first element 21 of second optical group 20;

$V_{22}$ is the Abbe number for second element 22 of second optical group 20;

$V_{23}$ is the Abbe number for third element 23 of second optical group 20;

$V_{24}$ is the Abbe number for fourth element 24 of second optical group 20;

$V_{31}$ is the Abbe number for first element 31 of third optical group 30;

$V_{32}$ is the Abbe number for second element 32 of third optical group 30;

$P_{11}$ is the partial dispersion for 1st element 11 of 1st optical group 10;

$P_{12}$ is the partial dispersion for 2nd element 12 of 1st optical group 10;

$P_{21}$ is the partial dispersion for 1st element 21 of 2nd optical group 20;

$P_{22}$ is the partial dispersion for 2nd element 22 of 2nd optical group 20;

$P_{23}$ is the partial dispersion for 3rd element 23 of 2nd optical group 20;

$P_{24}$ is the partial dispersion for 4th element 24 of 2nd optical group 20;

$P_{31}$ is the partial dispersion for 1st element 31 of 3rd optical group 30;

$P_{32}$ is the partial dispersion for 2nd element 32 of 3rd optical group 30;

All data is given for the wave length of 1450 nm.

Mutual combination of glasses' refractive indices, Abbe numbers and dispersions of the optical elements of the optical groups 1, 2 and 3 allows achieving wide field of view, orthoscopic distortion and apochromatic correction of the lens 200 along with a field curvature correction. Placing aspheres on a second surface 11*a* of the first element 11 of the first optical group 1 and on a first surface 32*a* of the element 32 of the third optical group 3 allows correction of the high order spherical aberration, astigmatism, and distortion. Element 24 of the second optical group 2 having a first surface 24*a*.

The Effective Focal Length (EFL) of the lens is 4.36 inches, the F # is 4, the Field of View (FOV) is 5.56°×66°, and the overall length is 5.2 inches.

Figure 3:
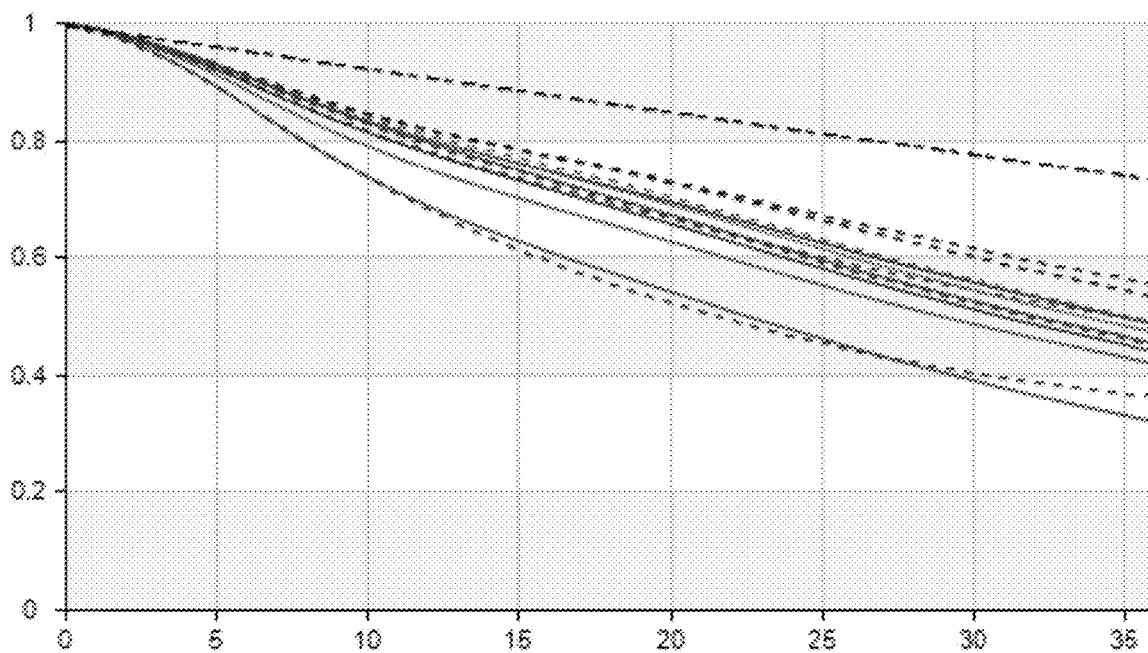
FIG. 3 is a graph showing a modulation transfer function (MTF) for the lens in FIG. 2 configured in accordance with an embodiment.

FIG. 3 presents MTF 300 for the embodiment of FIG. 2.

Figure 4:
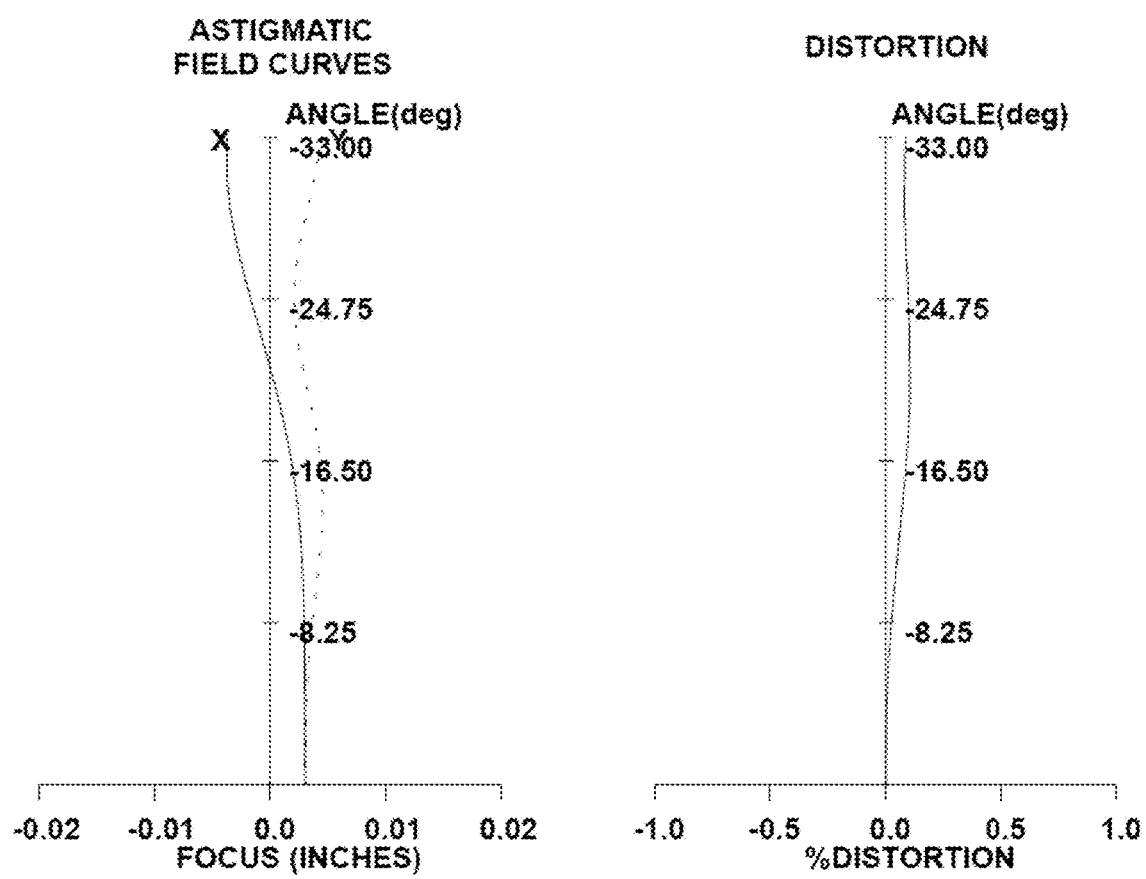
FIG. 4 shows astigmatism and distortion correction across the field for the lens in FIG. 2 configured in accordance with an embodiment.

FIG. 4 presents astigmatism and lens distortion 400 across the field, where distortion does not exceed 0.11% for the embodiment of FIG. 2.

Figure 5:
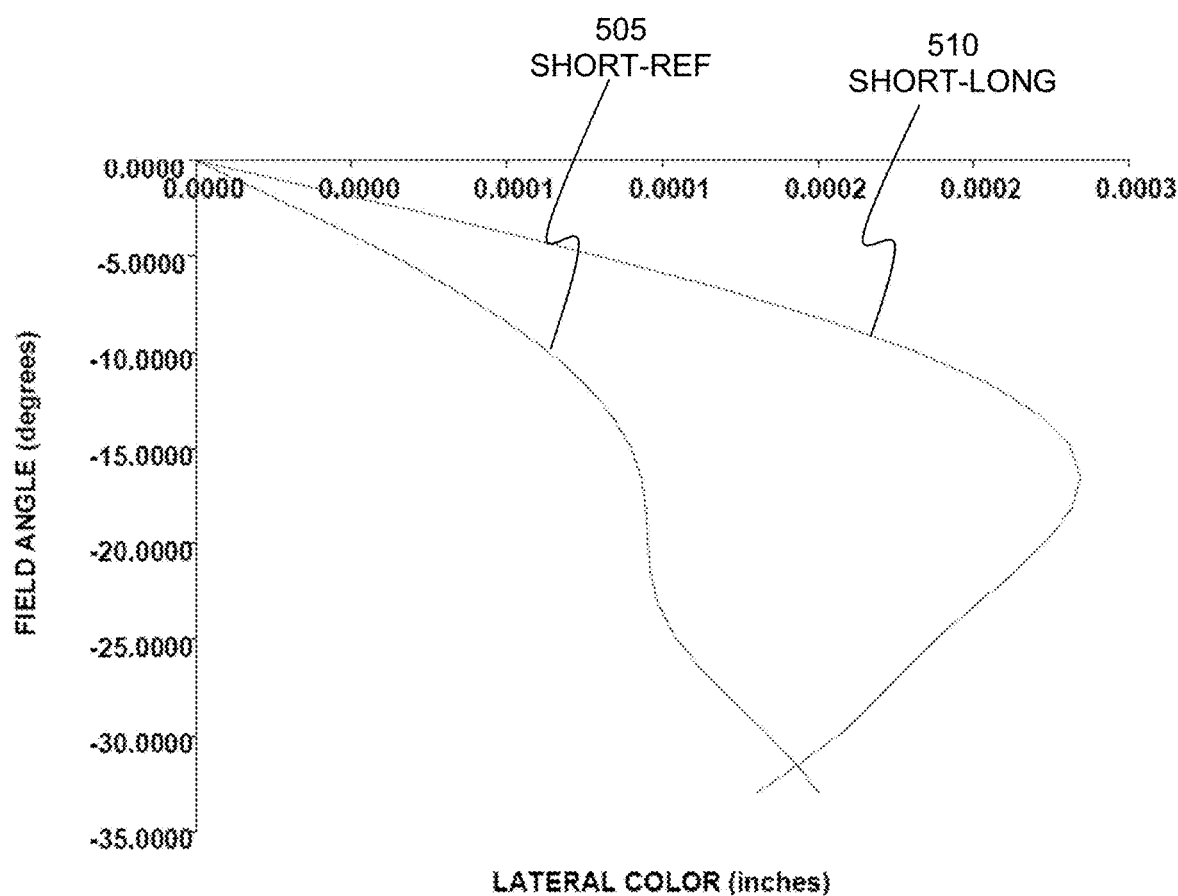
FIG. 5 shows a lateral color correction for the lens in FIG. 2 configured in accordance with an embodiment.

FIG. 5 presents a lateral color graph 500 showing apochromatic correction with outer and middle wavelength intersecting each other for Short-Ref 505 and Short-Long 510 for the embodiment of FIG. 2.

FIG. 6 through FIG. 9 present the prescription of the lens in presented in FIG. 2. Specifically, FIG. 6 depicts prescription page one of four 600, FIG. 7 depicts prescription page two of four 700, FIG. 8 depicts prescription page three of four 800, and FIG. 9 depicts prescription page four of four 900.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A compact orthoscopic and apochromatic visible and near-infrared (VNIR) and shortwave infrared (SWIR) lens system, in order from an object plane to an image plane, having three groups, comprising:
    a first optical group having a negative optical power, including exactly a first and a second optical lens elements;
    a second optical group having a positive optical power and including exactly a first, a second, a third, and a fourth optical lens elements, and an aperture stop positioned inside said second optical group;
    a third optical group having a negative optical power and including exactly a first and a second optical lens elements;
    wherein said first optical group first optical lens element is made in a form of a double concave optical element, and said first optical group second optical lens element is made in a form of a positive optical power meniscus whose concave surface faces toward an image;
    wherein said second optical group first optical lens element is made in a form of a double convex element, said second optical group second optical lens element is made in a form of a double convex element, said second optical group third optical lens element is made in a form of a double concave element, said second optical group second optical lens element and third optical lens element are cemented into a doublet, said second optical group fourth optical lens element is made in a form of a meniscus whose concave surfaces face toward an object;
    wherein said third optical group consists of two said lens elements in a form of a negative optical power meniscus whose concave surface faces toward said object, a first surface of said third optical group second lens element is formed as aspherical;
    focal lengths of the lens and of the optical groups satisfy the relationships:

$-0.25 < F'200/F'1 < -0.15$ $-8.5 < F'1/F'2 < -7.0$ $5.5 < F'1/F'3 < 7.5$ $0.75 < F'200/OAL < 0.90$ $0.95 < n11/n12 < 1.20$ $0.85 < n21/n22 < 1.10$ $0.95 < n22/n23 < 1.15$ $0.90 < n21/n24 < 1.10$ $0.95 < n24/n31 < 1.25$ $0.75 < n31/n32 < 0.95$ $0.45 < V11/V12 < 0.65$ $1.35 < V12/V21 < 1.65$ $0.70 < V21/V22 < 0.90$ $1.20 < V22/V23 < 1.40$ $0.95 < V23/V24 < 1.15$ $0.60 < V24/V31 < 0.85$ $1.05 < V31/V32 < 1.20$ $1.10 < P11/P12 < 1.25$ $0.80 < P12/P21 < 0.90$ $0.90 < P21/P22 < 1.15$ $0.95 < P22/P23 < 1.10$ $1.25 < P23/P24 < 1.55$ $0.40 < P24/P31 < 0.60$ $1.10 < P31/P32 < 1.35$ wherein:
F'200 is the focal length of the lens system;
F'1, F'2 and F'3 are the focal lengths of the first, the second and the third optical groups correspondingly;
OAL is the length of the lens system from a first optical surface to the image plane;
n11 is the refractive index for the first element of the first optical group;
n12 is the refractive index for the second element of the first optical group;
n21 is the refractive index for the first element of the second optical group;
n22 is refractive index for the second element of the second optical group;
n23 is the refractive index for the third element of the second optical group;
n24 is the refractive index for the fourth element of the second optical group;
n31 is the refractive index for the first element of the third optical group;
n32 is the refractive index for the second element of the third optical group;
V11 is the Abbe number for the first element of the first optical group;
V12 is the Abbe number for the second element of the first optical group;
V21 is the Abbe number for the first element of the second optical group;
V22 is the Abbe number for the second element of the second optical group;
V23 is the Abbe number for the third element of the second optical group;
V24 is the Abbe number for the fourth element of the second optical group;
V31 is the Abbe number for the first element of the third optical group;

V32 is the Abbe number for the second element of the third optical group;
P11 is the partial dispersion for the first element of the first optical group;
P12 is the partial dispersion for the second element of the first optical group;
P21 is the partial dispersion for the first element of the second optical group;
P22 is the partial dispersion for the second element of the second optical group;
P23 is the partial dispersion for the third element of the second optical group;
P24 is the partial dispersion for the fourth element of the second optical group;
P31 is the partial dispersion for the first element of the third optical group;
P32 is the partial dispersion for the second element of the third optical group;
wherein said lens system length is 5.2 inches as measured from the first optical surface to said image plane;
wherein a residual distortion of said lens system does not exceed 0.11% over a full field of view of 5.56° to 66°; and
wherein said lens system is apochromatic over a spectral range of 450 nm to 2450 nm.

2. The compact orthoscopic and apochromatic visible and near-infrared (VNIR) and shortwave infrared (SWIR) lens system of claim 1, wherein said first optical group first and second optical lens elements have, in order from the object, negative and positive optical powers.

3. The compact orthoscopic and apochromatic visible and near-infrared (VNIR) and shortwave infrared (SWIR) lens system of claim 1, wherein said second optical group first, second, third, and fourth optical lens elements have, in order from the object, positive, positive, negative, and positive optical powers.

4. The compact orthoscopic and apochromatic visible and near-infrared (VNIR) and shortwave infrared (SWIR) lens system of claim 1, wherein said third optical group first and second optical lens elements both have negative optical powers.

5. The compact orthoscopic and apochromatic visible and near-infrared (VNIR) and shortwave infrared (SWIR) lens system of claim 1, wherein said first optical lens element of said second optical group has a positive optical power and is made in a form of a double convex element.

6. The compact orthoscopic and apochromatic visible and near-infrared (VNIR) and shortwave infrared (SWIR) lens system of claim 1, wherein said second optical lens element of said second optical group has a positive optical power and is made in a form of a double convex element.

7. The compact orthoscopic and apochromatic visible and near-infrared (VNIR) and shortwave infrared (SWIR) lens system of claim 1, wherein said third optical lens element of said second optical group has a negative optical power and is made in a form of a double concave element.

8. The compact orthoscopic and apochromatic visible and near-infrared (VNIR) and shortwave infrared (SWIR) lens system of claim 1, wherein said fourth optical lens element of said second optical group has a positive optical power and is made in a form of a meniscus whose concave surfaces face toward said object plane.

9. The compact orthoscopic and apochromatic visible and near-infrared (VNIR) and shortwave infrared (SWIR) lens system of claim 1, wherein said first optical lens element of said third optical group is a negative optical power meniscus whose concave surface faces toward said object plane.

10. The compact orthoscopic and apochromatic visible and near-infrared (VNIR) and shortwave infrared (SWIR) lens system of claim 1, wherein said second optical lens element of said third optical group is a negative optical power meniscus whose concave surface faces toward said object plane.

11. The compact orthoscopic and apochromatic visible and near-infrared (VNIR) and shortwave infrared (SWIR) lens system of claim 1, further comprising a color filter and a focal plane window in front of a focal plane.

12. A method for forming a near-infrared (VNIR) and shortwave infrared (SWIR) image comprising:
providing a compact orthoscopic and apochromatic visible and near-infrared (VNIR) and shortwave infrared (SWIR) lens system, having three groups, in order from an object plane to an image plane, comprising:
a first optical group having a negative optical power, including exactly a first and a second optical lens elements;
a second optical group having a positive optical power and including exactly a first, a second, a third, and a fourth optical lens elements, and an aperture stop positioned inside said second optical group;
a third optical group having a negative optical power and including exactly a first and a second optical lens elements; and
a focal plane;
wherein said first optical group first optical lens element is made in a form of a double concave optical element, and said first optical group second optical lens element is made in a form of a positive optical power meniscus whose concave surface faces toward an image;
wherein said second optical group first optical lens element is made in a form of a double convex element, said second optical group second optical lens element is made in a form of a double convex element, said second optical group third optical lens element is made in a form of a double concave element, said second optical group second optical lens element and third optical lens element are cemented into a doublet, said second optical group fourth optical lens element is made in a form of a meniscus whose concave surfaces face toward an object;
wherein said third optical group consists of two said lens elements in a form of a negative optical power meniscus whose concave surface faces toward said object, a first surface of said third optical group second lens element is formed as aspherical,
focal lengths of the lens and of the optical groups satisfy the relationships:

$-0.25 < F'200/F'1 < -0.15$ $-8.5 < F'1/F'2 < -7.0$ $5.5 < F'1/F'3 < 7.5$ $0.75 < F'200/OAL < 0.90$ $0.95 < n11/n12 < 1.20$ $0.85 < n21/n22 < 1.10$ $0.95 < n22/n23 < 1.15$ $0.90 < n21/n24 < 1.10$ $0.95 < n24/n31 < 1.25$ $0.75 < n31/n32 < 0.95$ $0.45 < V11/V12 < 0.65$ $1.35 < V12/V21 < 1.65$ $0.70 < V21/V22 < 0.90$ $1.20 < V22/V23 < 1.40$ $0.95 < V23/V24 < 1.15$ $0.60 < V24/V31 < 0.85$ $1.05 < V31/V32 < 1.20$ $1.10 < P11/P12 < 1.25$ $0.80 < P12/P21 < 0.90$ $0.90 < P21/P22 < 1.15$ $0.95 < P22/P23 < 1.10$ $1.25 < P23/P24 < 1.55$ $0.40 < P24/P31 < 0.60$ $1.10 < P31/P32 < 1.35$ wherein:
F'200 is the focal length of the lens system;
F'1, F'2 and F'3 are the focal lengths of the first, the second and the third optical groups correspondingly;
OAL is the length of the lens system from a first optical surface to the image plane;
n11 is the refractive index for the first element of the first optical group;
n12 is the refractive index for the second element of the first optical group;
n21 is the refractive index for the first element of the second optical group;
n22 is refractive index for the second element of the second optical group;
n23 is the refractive index for the third element of the second optical group;
n24 is the refractive index for the fourth element of the second optical group;
n31 is the refractive index for the first element of the third optical group;
n32 is the refractive index for the second element of the third optical group;
V11 is the Abbe number for the first element of the first optical group;
V12 is the Abbe number for the second element of the first optical group;
V21 is the Abbe number for the first element of the second optical group;
V22 is the Abbe number for the second element of the second optical group;
V23 is the Abbe number for the third element of the second optical group;
V24 is the Abbe number for the fourth element of the second optical group;
V31 is the Abbe number for the first element of the third optical group;
V32 is the Abbe number for the second element of the third optical group;
P11 is the partial dispersion for the first element of the first optical group;
P12 is the partial dispersion for the second element of the first optical group;
P21 is the partial dispersion for the first element of the second optical group;
P22 is the partial dispersion for the second element of the second optical group;
P23 is the partial dispersion for the third element of the second optical group;
P24 is the partial dispersion for the fourth element of the second optical group;
P31 is the partial dispersion for the first element of the third optical group;
P32 is the partial dispersion for the second element of the third optical group;
wherein said lens system length is 5.2 inches as measured from the first optical surface to said image plane;
wherein a residual distortion of said lens system does not exceed 0.11% over a full field of view of 5.56° to 66°; and
wherein said lens system is apochromatic over a spectral range of 450 nm to 2450 nm; and
orienting said lens system toward an object, whereby an image of said object is formed on said focal plane.

13. The method of claim 12, wherein said first optical group is arranged to diverge light received from an object and to direct said diverged light onto said second optical group.

14. The method of claim 12, wherein said second optical group is arranged to converge light from said first optical group and to direct said converged light onto said third optical group.

15. The method of claim 12, wherein said third optical group is arranged to diverge light from said second optical group and to direct it onto said focal plane.

16. The method of claim 12, wherein said aperture stop is positioned inside said second optical group between said first and said second optical lens elements of said second optical group.

17. An airborne sensor comprising a compact orthoscopic and apochromatic visible and near-infrared (VNIR) and shortwave infrared (SWIR) lens system, having three groups, in order from an object plane to an image plane, comprising:
a first optical group having a negative optical power, including exactly a first and a second optical lens elements;
a second optical group having a positive optical power and including exactly a first, a second, third, and a fourth optical lens elements;
a third optical group having a negative optical power and including exactly a first and a second optical lens elements;
an aperture positioned inside said second optical group; and
a focal plane;
wherein said first optical group first optical lens element is made in a form of a double concave optical element, and said first optical group second optical lens element is made in a form of a positive optical power meniscus whose concave surface faces toward an image;
wherein said second optical group first optical lens element is made in a form of a double convex element, said second optical group second optical lens element is made in a form of a double convex element, said second optical group third optical lens element is made in a form of a double concave element, said second optical group second optical lens element and third optical lens element are cemented into a doublet, said second optical group fourth optical lens element is made in a form of a meniscus whose concave surfaces face toward an object;

wherein said third optical group consists of two said lens elements in a form of a negative optical power meniscus whose concave surface faces toward said object, a first surface of said third optical group second lens element is formed as aspherical;

focal lengths of the lens and of the optical groups satisfy the relationships:

$$-0.25 < F'200/F'1 < -0.15$$

$$-8.5 < F'1/F'2 < -7.0$$

$$5.5 < F'1/F'3 < 7.5$$

$$0.75 < F'200/OAL < 0.90$$

$$0.95 < n11/n12 < 1.20$$

$$0.85 < n21/n22 < 1.10$$

$$0.95 < n22/n23 < 1.15$$

$$0.90 < n21/n24 < 1.10$$

$$0.95 < n24/n31 < 1.25$$

$$0.75 < n31/n32 < 0.95$$

$$0.45 < V11/V12 < 0.65$$

$$1.35 < V12/V21 < 1.65$$

$$0.70 < V21/V22 < 0.90$$

$$1.20 < V22/V23 < 1.40$$

$$0.95 < V23/V24 < 1.15$$

$$0.60 < V24/V31 < 0.85$$

$$1.05 < V31/V32 < 1.20$$

$$1.10 < P11/P12 < 1.25$$

$$0.80 < P12/P21 < 0.90$$

$$0.90 < P21/P22 < 1.15$$

$$0.95 < P22/P23 < 1.10$$

$$1.25 < P23/P24 < 1.55$$

$$0.40 < P24/P31 < 0.60$$

$$1.10 < P31/P32 < 1.35$$

wherein:

F'200 is the focal length of the lens system;
F'1, F'2 and F'3 are the focal lengths of the first, the second and the third optical groups correspondingly;
OAL is the length of the lens system from a first optical surface to the image plane;

n11 is the refractive index for the first element of the first optical group;
n12 is the refractive index for the second element of the first optical group;
n21 is the refractive index for the first element of the second optical group;
n22 is refractive index for the second element of the second optical group;
n23 is the refractive index for the third element of the second optical group;
n24 is the refractive index for the fourth element of the second optical group;
n31 is the refractive index for the first element of the third optical group;
n32 is the refractive index for the second element of the third optical group;
V11 is the Abbe number for the first element of the first optical group;
V12 is the Abbe number for the second element of the first optical group;
V21 is the Abbe number for the first element of the second optical group;
V22 is the Abbe number for the second element of the second optical group;
V23 is the Abbe number for the third element of the second optical group;
V24 is the Abbe number for the fourth element of the second optical group;
V31 is the Abbe number for the first element of the third optical group;
V32 is the Abbe number for the second element of the third optical group;
P11 is the partial dispersion for the first element of the first optical group;
P12 is the partial dispersion for the second element of the first optical group;
P21 is the partial dispersion for the first element of the second optical group;
P22 is the partial dispersion for the second element of the second optical group;
P23 is the partial dispersion for the third element of the second optical group;
P24 is the partial dispersion for the fourth element of the second optical group;
P31 is the partial dispersion for the first element of the third optical group;
P32 is the partial dispersion for the second element of the third optical group;
wherein said sensor is compact, with an overall length of 5.2 inches as measured from the first optical surface to said image plane;
wherein said sensor is orthoscopic with a residual distortion not exceeding 0.11% over a full field of view of 5.56° to 66°; and
wherein said sensor is apochromatic over a spectral range of 450 nm to 2450 nm;
whereby an image of an object is formed on said focal plane; and
wherein said focal plane comprises a CCD or CMOS sensor.

* * * * *